Oct. 21, 1930.  G. A. DALTON ET AL  1,778,797
GEAR
Filed March 14, 1927  4 Sheets-Sheet 1
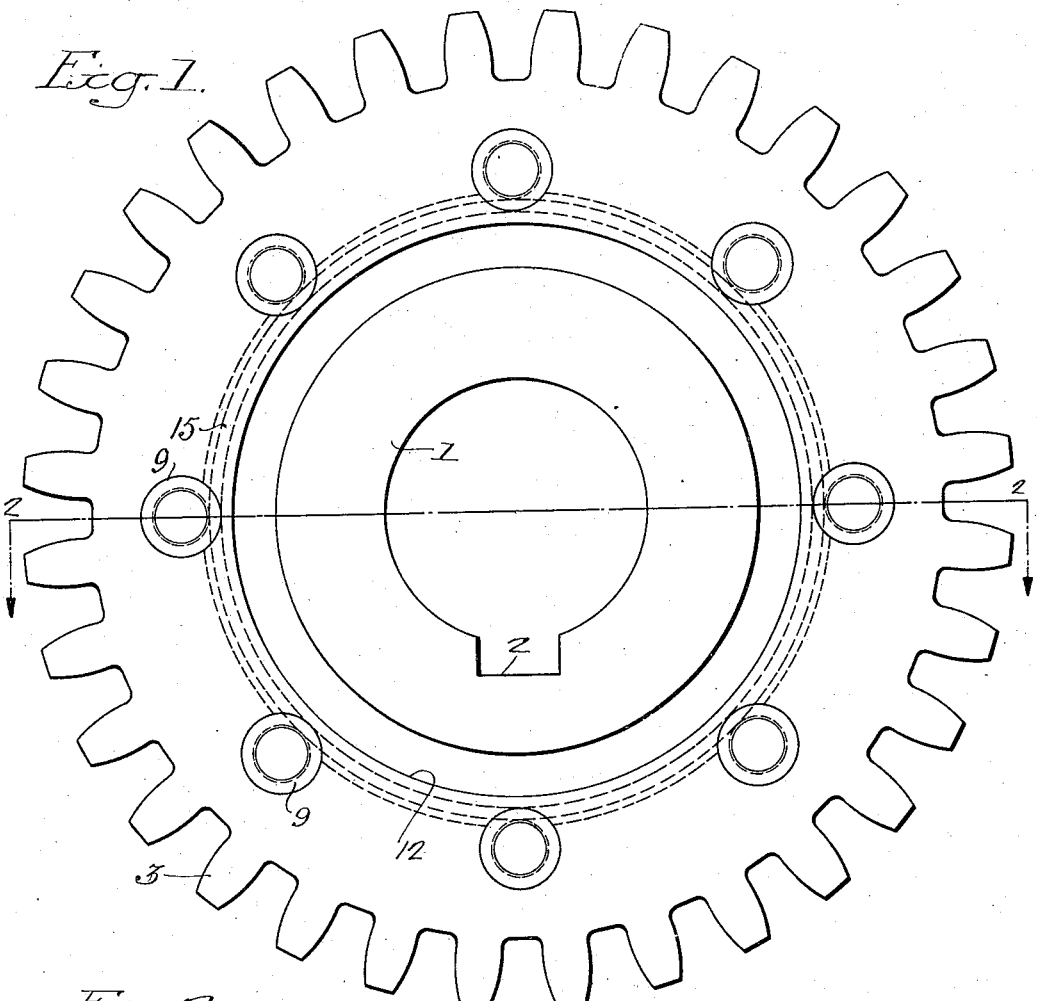
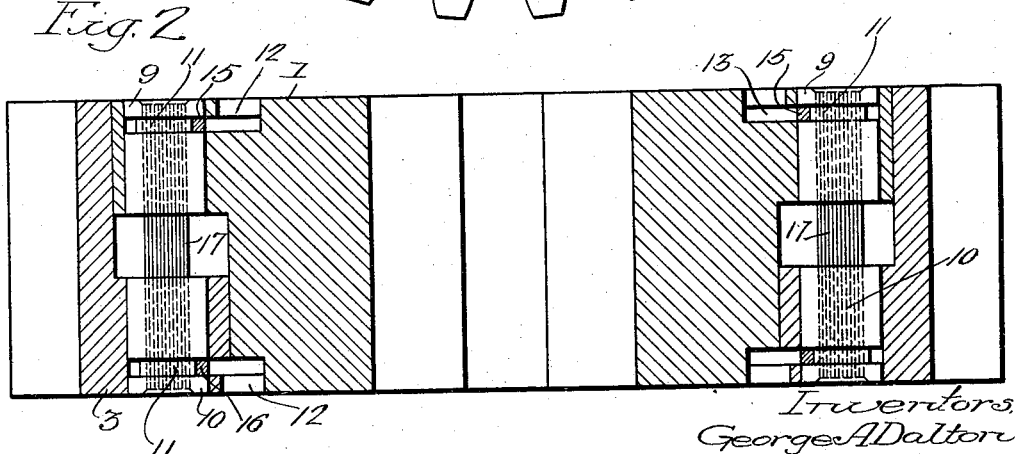

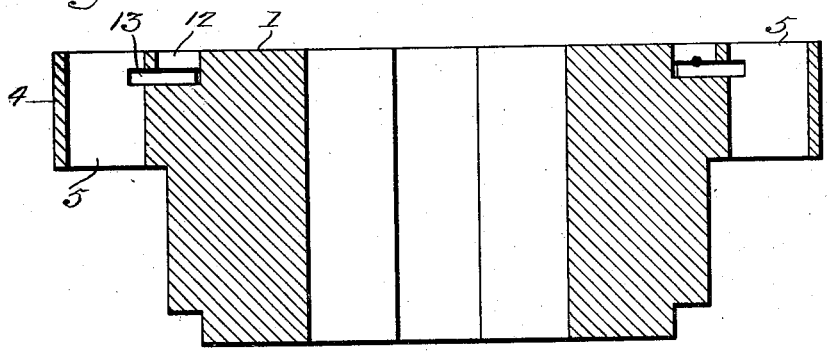
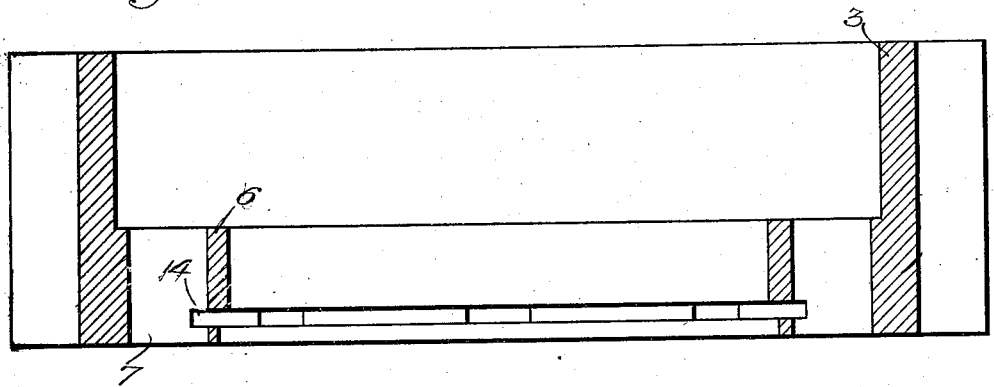
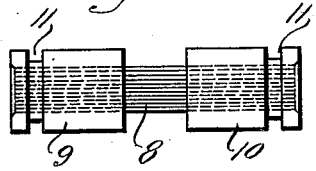
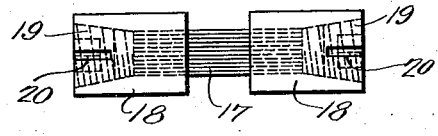

Oct. 21, 1930.  G. A. DALTON ET AL  1,778,797
GEAR
Filed March 14, 1927  4 Sheets-Sheet 3

Inventors,
George A. Dalton,
John R. Dunham,
by their Attorneys
Howson & Howson

Oct. 21, 1930. G. A. DALTON ET AL 1,778,797
GEAR
Filed March 14, 1927 4 Sheets-Sheet 4
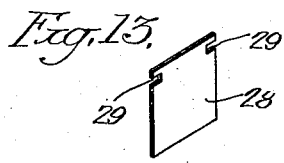
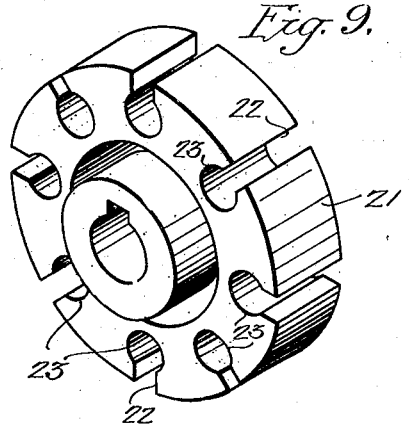
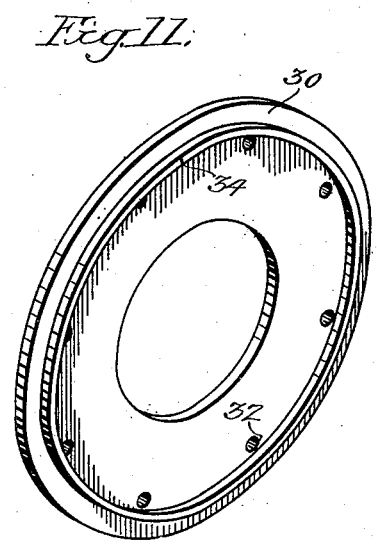
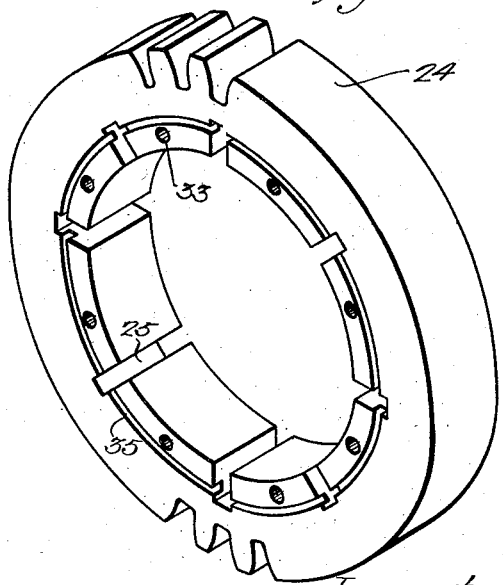
Inventors:
George A. Dalton,
John R. Dunham,
by his Attorneys
Howson & Howson Patented Oct. 21, 1930

1,778,797

UNITED STATES PATENT OFFICE

GEORGE A. DALTON AND JOHN R. DUNHAM, OF HIGHLAND PARK, NEW JERSEY, ASSIGNORS TO FLEXIBLE ENGINEERING CORPORATION, OF NEW YORK, N. Y., A CORPORATION OF NEW YORK

GEAR

Application filed March 14, 1927. Serial No. 175,239.

The principal object of this invention is to provide a gear having novel means for affording flexibility between driving and driven members operatively connected by said gear. The invention further resides in certain novel structural details and useful features hereinafter fully described and illustrated in the attached drawings, in which:

Figure 1 is a side view of a gear made in accordance with our invention;

Fig. 2 is a section on the line 2—2, Fig. 1;

Fig. 3 is a diametral section of the inner gear element or hub;

Fig. 4 is a similar section of the outer gear element;

Fig. 5 is a view of a preferred form of flexible element for connecting the outer and inner gear elements shown in Figs. 3 and 4;

Fig. 6 is a view of a modified form of flexible element;

Fig. 9 is a view in perspective of the inner gear or hub element of the embodiment illustrated in Figs. 7 and 8;

Fig. 10 is a view in perspective of the outer element of the gear shown in Figs. 7 and 8;

Fig. 11 is a view in perspective of one of the side plates of the gear embodiment illustrated in Figs. 7 to 10;

Fig. 12 is a view in perspective of one of the keeper elements used with the gears shown in Figs. 7 to 11, and Fig. 13 is a view in perspective of one of the elements which with others make up the individual flexible members which connect the inner and outer gear elements shown in Figs. 9 and 10.

Figure 7:
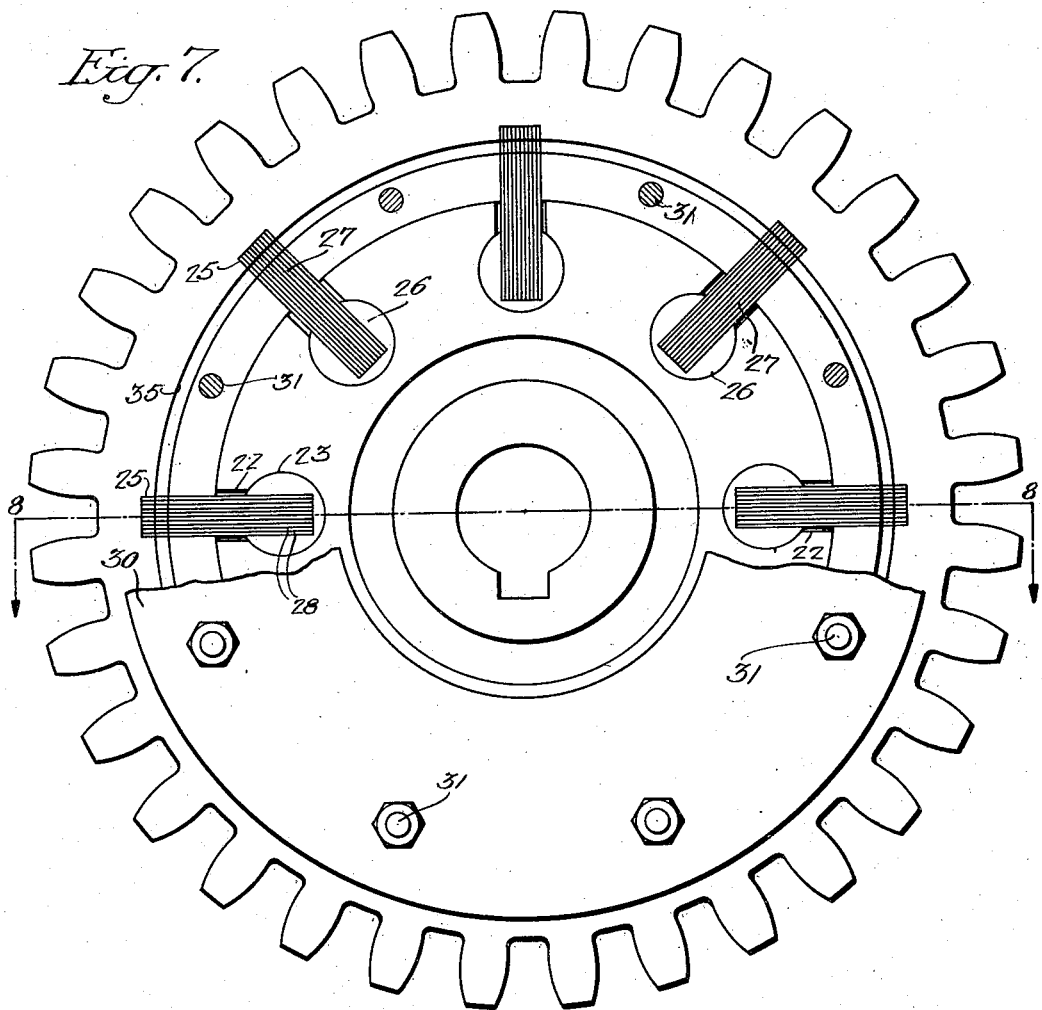
Fig. 7 is a side view fragmentary in part illustrating another embodiment of the gear.
Figure 8:
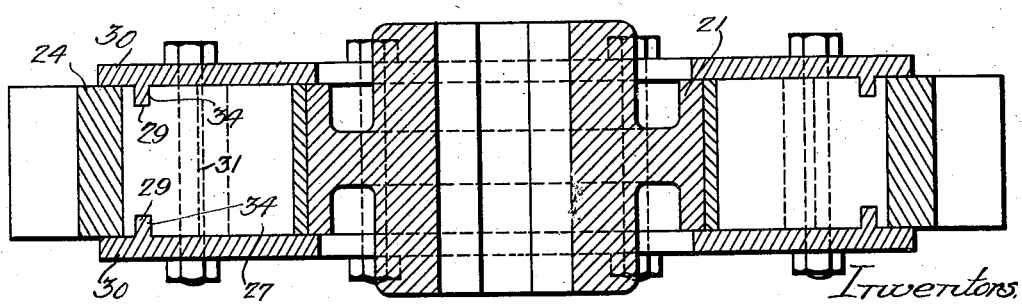
Fig. 8 is a section on the line 8—8, Fig. 7.

With reference to the drawings, the gear in a preferred form comprises an inner or hub element 1, which may be provided with the usual keyway 2 through which the element may be attached to a rotary shaft; and an outer annular element 3 in which the gear teeth are formed, as shown in Fig. 1. The general form of these elements 1 and 3 is best shown in Figs. 3 and 4 respectively.

The element 1 has adjacent one face an annular extension 4 in which is formed a continuous or annular series of cylindrical openings 5, the axes of these openings paralleling the axis of the element in which they are formed. The member 3 has a corresponding flange 6 which, adjacent one face of the ring, projects inwardly from the inner periphery, and this flange is also provided with a series of cylindrical apertures 7 corresponding in number and relative position with the apertures 5 of the member 1. The member 1 is adapted to fit more or less snugly into the interior of the member 3, as shown in Fig. 2, the outer surface of the flange 4 and the inner surface of the flange 6 in each instance finding an opposed bearing surface on the other member. It will be noted that while the parts 1 and 3 have free relative angular movement, the opposed bearing surfaces tend to prevent angular misalignment of the elements.

The elements 1 and 3 are adapted to be secured together by means of flexible elements, a preferred form of which is illustrated in Fig. 5. This element consists of a bundle 8 of flexible wires, the bundle preferably being cylindrical in form and having its ends secured by welding or other suitable means in keepers 9 and 10 respectively. These keepers are cylindrical in form and of such diameter as to neatly fit within the openings 5 and 7 of the elements 1 and 3. In the present instance, each of the keepers is provided near its outer end with an annular peripheral groove 11 constituting means for retaining the keepers in the openings of the elements 1 and 3 which they respectively occupy.

As illustrated, the element 1 is provided in the face adjoining the flange 4 with an annular recess 12, from the inner end of which a transverse recess 13 extends outwardly sufficiently far to enter the openings 5. A substantially similar device is employed in connection with the element 3, this element also being provided with an annular recess 14 which extends from the inner face of the flange 6 outwardly and into the openings 7. In assembly and as shown in Fig. 2, the keepers 9 and 10 may respectively occupy the openings 5 and 7 of the elements, and flexible split rings 15 and 16 inserted into the recesses 13 and 14 enter by expansion the grooves 11 of the keepers and effectively retain the keepers in the openings.

A gear constructed as described obviously possesses flexiblity in an angular direction tending to absorb sudden shocks impressed in the direction of rotation on either of the elements 1 or 3. It will be noted further that the flexible elements secure the elements 1 and 3 together in an axial direction.

In Fig. 6, we have illustrated a modified form of flexible element. In this instance, the same cylindrical bundle of flexible wires or springs 17 may be used, the ends being inserted in correspondingly shaped openings in cylindrical keepers 18 and secured therein by welding or in any suitable manner. The outer end of the openings in which the ends of the flexible bundle 17 are inserted is in each instance tapered or conical in form and is threaded for reception of a conical plug 19. Also the outer end of each of the keepers 18 is split in an axial direction, as indicated at 20, so that when the plugs 19 are turned down into the keepers they have a tendency to spread the outer ends of the latter.

The keepers 18 are adapted to occupy the openings 5 and 7 in the elements 1 and 3, as previously described in connection with the flexible element shown in Fig. 5, and the keepers may be secured or anchored in the openings after insertion by turning down the plugs 19 as described to spread the outer ends of the keepers against the walls of the said openings. This type of keeper permits elimination of the retaining rings previously described.

In Figs. 7 to 13, inclusive, we have illustrated a modified form of gear in which the flexible elements connecting the inner and outer gear elements are arranged radially so that the thrust between the inner and outer gear elements is in a direction corresponding accurately with the plane of rotation. In this instance, the inner gear or hub element 21 is provided in its periphery with a series of evenly spaced slots 22 which extend radially into transverse cylindrical openings 23. The outer gear or ring element 24 is provided in its inner periphery with a corresponding series of radial slots 25. In assembly, cylindrical keepers 26 occupy the openings 23 in the element 21, these keepers being slotted for reception of the inner ends of substantially rectangular flexible connector elements 27 which project outwardly through the slots 22 and into the slots 25 of the outer element, as shown in Fig. 7. The flexible elements 27 may be composed of a number of flat flexible steel plates 28 laid face to face. As shown in Fig. 13, each of these plates is provided near its outer end with a pair of recesses 29, 29, extending inwardly from the side edges.

This gear comprises a pair of side plates 30, one of which is shown in perspective in Fig. 11, and these plates are held in place against the faces of the gear by means of bolts 31 which pass through openings 32 in the said plates and through correspondingly arranged openings 33 in the outer ring 24. Each of the plates 30 has projecting from its inner face an annular flange or rib 34 which projects into an annular groove 35, see Fig. 10, in the side of the outer gear element 24, this groove 35 intersecting the outer edges of the recesses 25. In assembly, the grooves 35 register with the recesses 29 of the flexible elements 28 so that when the face plates 30 are applied to the sides of the gear the flanges 34 thereof enter the recesses 29 and thereby retain the flexible connecting members 27 in position.

The principle of operation of this gear is the same as that of the embodiment previously described.

We claim:

1. A gear comprising a hub element, an annular toothed element surrounding said hub element, an annular flange extending outwardly from the periphery of said hub element, an annular flange extending inwardly from the inner periphery of the annular toothed element, transverse cylindrical openings in said flanges corresponding in number and positioned and adapted for axial alignment, flexible connector elements having cylindrical keepers at opposite ends thereof adapted respectively to occupy the openings of said flanges, and a single means associated with each flange for retaining all of the keepers engaged in openings of said flange against axial displacement in said openings while permitting rotation thereof.

2. A gear comprising a hub element and an annular toothed element surrounding said hub element, confronting faces of said hub and toothed elements having a single flange, said flanges disposed in side to side relation, said flanges having aligned cylindrical openings, flexible connector elements disposed in said openings and including externally cylindrical portions rotatably fitting the openings, the outer face of each flange having a groove disposed inwardly of the openings, the inner end of said groove being enlarged to communicate with openings, the externally cylindrical portions each having an annular groove in alignment with the enlargement of the groove, and expansible rings disposed in the enlargements of the flange grooves and engaging in the grooves of the connector elements.

GEORGE A. DALTON.
JOHN R. DUNHAM.